(12) United States Patent
Achenson et al.

(10) Patent No.: US 6,477,586 B1
(45) Date of Patent: Nov. 5, 2002

(54) REMOTE PROCEDURE CALLS IN DISTRIBUTED SYSTEMS

(75) Inventors: Doug W. F. Achenson, Ajax; Victor Robert Bocking, Markham; Mark W. Brooks, Richmond Hill; Gregory Burdzinski, Mississauga; Hennedy Dee Eng, North York; Melvin Seiji Hama, Etobicoke; Connis Zhang, Toronto, all of (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/106,429

(22) Filed: Jun. 29, 1998

(51) Int. Cl.[7] ............................................. G06F 13/00
(52) U.S. Cl. ...................... 709/330; 709/100; 709/102; 709/315
(58) Field of Search ................................. 709/330, 100, 709/101, 102, 103, 104, 105, 315, 327, 328, 329, 223, 238

(56) References Cited

U.S. PATENT DOCUMENTS

| | | | | |
|---|---|---|---|---|
| 4,839,798 A | * | 6/1989 | Eguchi et al. ............... | 364/200 |
| 4,953,204 A | * | 8/1990 | Cuschleg, Jr. et al. ...... | 379/266 |
| 5,031,089 A | * | 7/1991 | Liu et al. ..................... | 364/200 |
| 5,377,350 A | * | 12/1994 | Skinner ....................... | 395/600 |
| 5,404,523 A | * | 4/1995 | DellaFera et al. ........... | 395/650 |
| 5,655,120 A | * | 8/1997 | Witte et al. .................. | 395/675 |
| 5,938,708 A | * | 8/1999 | Wallace et al. ............... | 701/48 |
| 6,031,841 A | * | 2/2000 | Woundy ....................... | 370/410 |
| 6,105,053 A | * | 8/2000 | Kimmel et al. .............. | 709/105 |
| 6,182,108 B1 | * | 1/2001 | Williams et al. ............ | 709/102 |
| 6,192,413 B1 | * | 2/2001 | Lee et al. ................... | 709/238 |
| 6,226,689 B1 | * | 5/2001 | Shah et al. .................. | 709/314 |

* cited by examiner

Primary Examiner—Majid Banankhah
(74) Attorney, Agent, or Firm—Gail H. Zarick; Anne Vachon Dougherty

(57) ABSTRACT

A multi-threaded, multi process distributed system including remote call procedure (RPC) messages. The threads in the distributed system are each associated with a queue. The RPC messages each include an identifier to identify the queue which is associated with the thread which has originated the RPC message, as well as an identifier indicating the connection over which the RPC message is communicated from one process to another. The connection over which RPC requests are forwarded in the distributed system is made between one process and another process. The RPC messages sent between processes utilise the same connection, independent of which thread in each process is sending or receiving the messages. RPC messages are forwarded through the distributed system and the connection and queue identifiers in the RPC messages are updated as the message is forwarded from process to process in the distributed system.

18 Claims, 2 Drawing Sheets

REMOTE PROCEDURE CALLS IN DISTRIBUTED SYSTEMS

FIELD OF THE INVENTION

The present invention is directed to an improvement in distributed systems and in particular to remote procedure call messages between multi-threaded processes in a distributed system.

BACKGROUND OF THE INVENTION

Distributed computer systems involve different processes which may execute simultaneously. The processes may be found on physically distinct processors or the processes may be implemented on a single processor. In multi-threaded distributed systems, each process may run one or more threads. Such distributed multi-threaded, multi-process systems are well known, particularly in real time processing applications such as systems for telephone control and management. Multi-threaded, multi-process distributed systems raise timing, scheduling, queuing, synchronizing and interprocess/interprocessor communications issues which must be solved to ensure that the distributed system runs efficiently and effectively.

In multi-threaded, multi-process distributed systems, one characteristic function made available in the system is a remote procedure call (RPC) function. An RPC permits a process in the distributed system to request that a different process in the system carry out a function implemented in that second process and, return information to the process having originated the RPC request. The RPC is implemented by an RPC message being transmitted across the distributed system such that the responding process receives the RPC and takes the appropriate steps as defined by the RPC message.

In distributed systems implemented using a TCP/IP protocol, the RPC will take the form of a TCP/IP-compliant message sent in accordance with the TCP/IP protocol.

In prior art multi-processor, multi-threaded systems, a thread which originates an RPC will open a communication channel (in the TCP/IP protocol, a socket) which will permit the thread in the process to communicate the RPC to a second process. Should there be several threads which originate RPCs, a corresponding number of channels, (or sockets) will be opened to permit each thread to communicate with the appropriate process. In such systems the channel will remain open until the response to the RPC is received by the originating thread, or the channel will be opened and closed for the transmittal of the RPC, and for the receipt of the RPC, incurring the associated operating system overhead cost.

In such prior art systems, it is typical that the thread and process originating an RPC request will make use of a central registry (or broker) which provides the identity of the process able to respond to the RPC to the process originating the RPC. A direct connection is then established between the originating process and the responding process to permit the RPC request message to be communicated from the originating process to the responding process and the response to likewise be communicated.

In a distributed system where the numbers of channels (or sockets) is a constrained resource, it will be appreciated that the use of a communication channel (or socket) by each thread wishing to originate an RPC, will create resource allocation, or operating system overhead, problems for the distributed system. In addition, the use of a central broker or registry creates overhead problems for such a distributed system.

It is therefore desirable to have an improved distributed system in which it is not necessary for each thread in the multi-threaded multiprocessing distributed system to request allocation of a channel (or socket) to permit the transmittal of an RPC message. Similarly, it is desirable to have a system which does not rely upon a central broker or registry of processes to be used by the system to determine which processes are appropriate to receive a given RPC message.

SUMMARY OF THE INVENTION

According to one aspect of the present invention, there is provided an improved multi-threaded, multi-process distributed system.

According to a further aspect of the present invention, there is provided an improved multi-threaded, multi-process distributed system comprising a plurality of processes, each of the said processes comprising a plurality of threads and a means for receiving, composing, and forwarding remote procedure call messages, the distributed system comprising, a queue associated with each of the threads, each of the queues in each of the processes being associated with a predetermined queue identifier selected to uniquely identify each queue within each process, a set of connections selectively established between the processes, each one of the set of connections being associated with a predetermined connection identifier selected to uniquely identify the connection with the distributed processing system, the remote procedure call messages each comprising, a first data element corresponding to a selected one of the queue identifiers, and a second data element corresponding to a selected one of the connection identifiers.

According to a further aspect of the present invention, the improved multi-threaded, multi-process distributed system as set out above is provided in which the set of connections consists of connections characterized by each pair of processes selected from the processes in the distributed processing system having no more than one connection between the pair of processes at any one time.

According to a further aspect of the present invention, the improved multi-threaded, multi-process distributed system as set out above is provided in which a one of the remote procedure call messages, having been forwarded over a connection by a first one of the processes, to a second one of the processes, for forwarding to a third one of the processes, is characterized by, its first data element corresponding to the queue identifier of a one of the queues in the second one of the processes, and its second data element corresponding to the connection identifier of the connection from the first one of the process to the second one of the processes, and wherein the one of the remote procedure call messages, when composed by an originating one of the processes, is characterized by its first data element corresponding to the queue identifier of an originating one of the queues in the originating one of the processes, and its second data element being set to a predefined null value.

According to a further aspect of the present invention, the improved multi-threaded, multi-process distributed system as set out above is provided in which in each process the means for receiving, composing, and forwarding remote procedure call messages comprises update means for modifying the second data element in a received one of the remote procedure call messages by storing, in the second data element, the connection identifier of the connection by which the received one of the remote procedure call messages was forwarded to the process, means for determining whether the received one of the remote procedure call messages is processable within the process, means for processing the received one of the remote procedure call messages when the selected one of the remote procedure call messages is determined to be processable within the process, means for composing a remote procedure call message response when the selected one of the remote procedure call messages has been processed within the process, means for forwarding the remote procedure call message response by the connection indicated by the second data element of the received one of the remote procedure call messages, means for selecting, from the set of the processes of the distributed processing system, when it is determined that the received one of the remote procedure call messages is not processable within the process, a further different process for processing the received one of the remote procedure call messages, and means for forwarding the received one of the remote procedure call messages to the further different process, means for storing in a data location local to the process, the first and second data elements of the received one of the remote procedure call messages, means for updating the first data element of the received one of the remote procedure call messages to identify a one of the queues in the process.

According to a further aspect of the present invention, there is provided a method for creating and forwarding remote procedure call messages in a distributed processing system, the distributed processing system comprising a plurality of processes, each of the said processes comprising a plurality of threads and a means for receiving, composing, and forwarding remote procedure call messages, a queue associated with each of the threads, each of the queues in each of the processes being associated with a predetermined queue identifier selected to uniquely identify each queue within each process, a set of connections selectively established between the processes, each one of the set of connections being associated with a predetermined connection identifier selected to uniquely identify the connection with the distributed processing system, the method comprising the steps of a) selectively establishing a set of connections between the processes in the distributed processing system, whereby a first selected process is connected to a second selected process by no more than one connection, and b) forwarding one or more remote procedure call messages in the distributed processing system by storing, updating and referencing queue identifier and connection identifier data in the remote procedure call messages.

According to a further aspect of the present invention, the method as set out above including the steps of:

a) responding to an originating remote procedure call in a first thread in a first process by creating a remote procedure call message in the first process comprising i) a first data element corresponding to the queue identifier of the first thread, and ii) a second data element being set to a predefined null value.

b) selecting a second process for receipt of the remote procedure call message, c) forwarding the remote procedure call message to the second process, d) in the second process, modifying the second data element to correspond to the connection identifier of the connection between the first process and the second process, e) in the second process, determining whether the remote procedure call message is processable within the second process, f) when the remote procedure call message is determined to be processable within the process:

g) processing the remote procedure call message within the process, h) creating a response in the remote procedure call message, i) returning the remote procedure call message by the connection indicated by the second data element, j) when it is determined that the received one of the remote procedure call messages is not processable within the process:

i) selecting, from the set of the processes of the distributed processing system, a third process for processing the remote procedure call message, ii) storing in a data location local to the second process, the first and second data elements of the remote procedure call message, iii) updating the first data element to identify a one of the queues in the second process, and iv) forwarding the remote procedure call messages to the third process.

Advantages of the present invention include a multi-threaded, multi-process distributed system in which a single communication channel between processes may be utilized to communicate RPC messages from different threads within the same process. Further advantages include a multi-threaded, multi-process distributed system which maintains the information relating to which process is appropriate to respond to a given RPC, within the originating process, rather than at a central broker or registry.

BRIEF DESCRIPTION OF THE DRAWINGS

The preferred embodiment of the invention is shown in the drawings, wherein.

Figure 1:
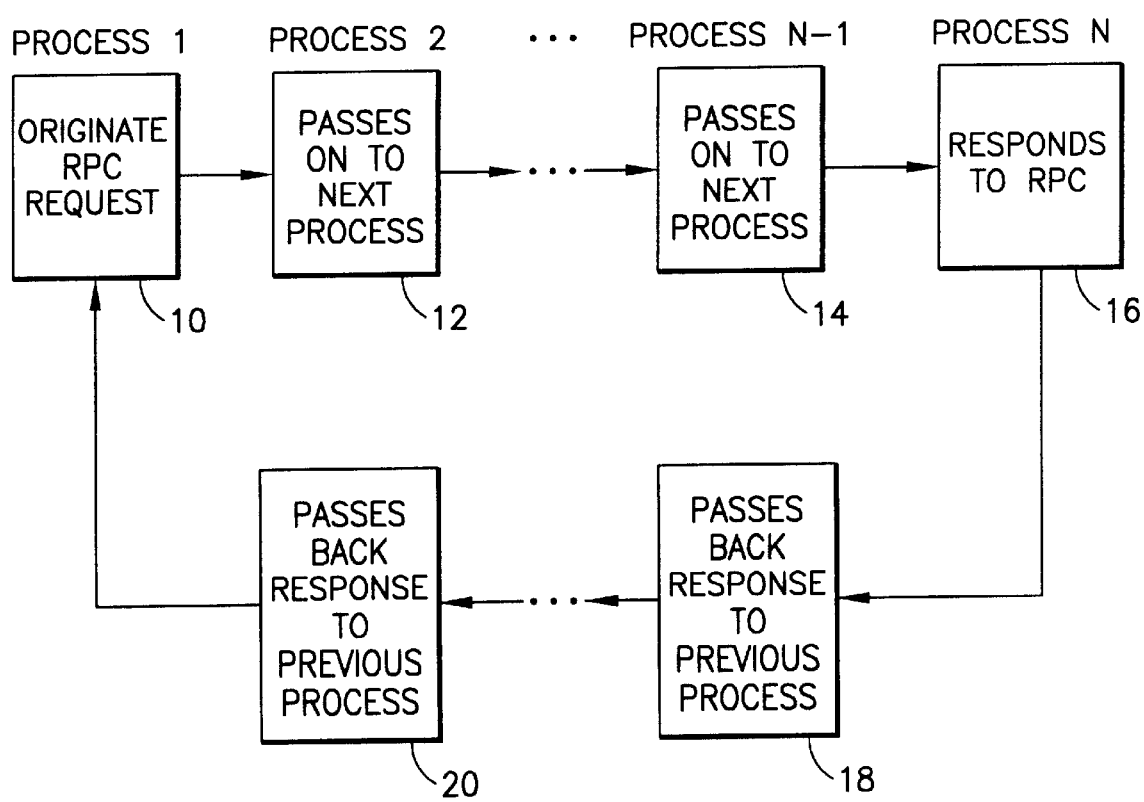
FIG. 1 is a flow diagram showing the path of an RPC in the distributed system of the preferred embodiment of the invention.

In the drawings, the preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENTS

Referring to FIG. 1, there is illustrated in a flow diagram, the path an RPC request message in the distributed system of the preferred embodiment of the invention, from Process 1 through Process N. The example of the preferred embodiment in FIG. 1 includes a functional block 10 which originates the RPC request message, a block 12 which receives the RPC request message of block 10 and forwards the RPC request message to functional block 14, which receives the RPC request message and functional block 16 which receives and responses to the RPC request originated in functional block 10. The functional block 16 which responds to the RPC request message passes an RPC response message back to Process N-1 which, in functional block 18 passes the RPC response message to the previous process. Upon receipt of the RPC response message by Process 2, functional block 20 passes the RPC response message to Process 1 which originated the RPC request message, initially.

Figure 2:
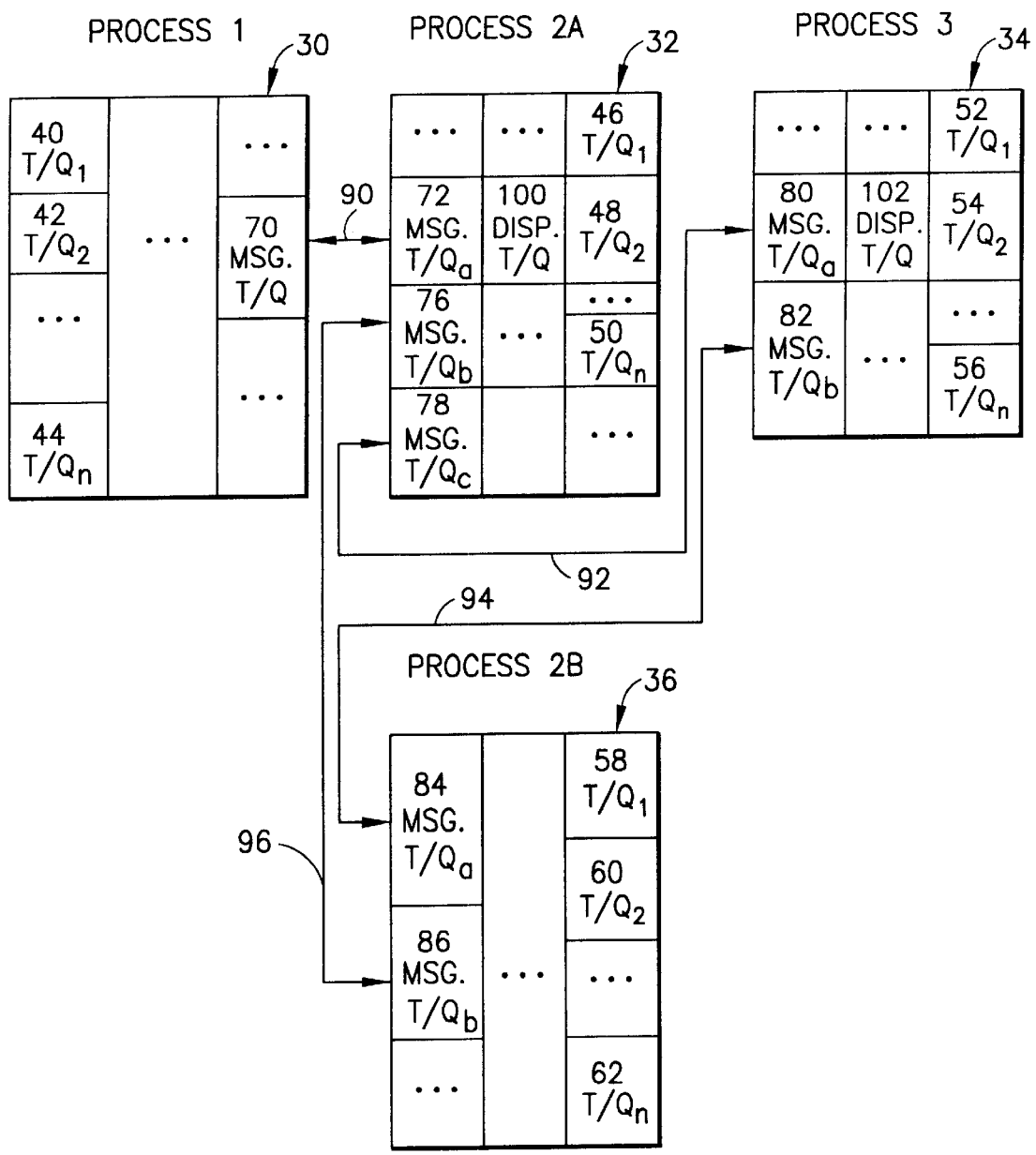
FIG. 2 is a block diagram showing the high level functional components, and communication paths, in the distributed system of the preferred embodiment of the invention.

In FIG. 2, a block diagram shows the processes of the distributed system of the preferred embodiment of the invention. FIG. 2 shows block 30 representing Process 1, block 32 representing process 2A, block 34 representing process 3 and block 36 representing process 2B. Process 1 of block 30 is shown including threads and associated queues for the threads. Thread and queue pair 1 is shown in block 40, thread and queue pair 2 is shown in block 42 and thread and queue pair n is shown in block 44. Similarly, with respect to process 2A shown in block 32, the threads and associated queue pairs 1, 2 . . . n are indicated as blocks 46, 48 and 50. For process 3, shown in block 34, the thread and queue pairs are shown as block 52, 54 and 56. Finally, process 2B, shown in block 36 has thread queue pairs 1, 2 . . . n as reflected in blocks 58, 60 and 62.

Process 1 is shown containing a thread and queue pairing responsible for message receipt in block 70. The transmission of an RPC message from Process 1 may be accomplished the block 70 including, or having associated with it, a functional component responsible for sending messages. Process 2A in block 32 is shown as having a message thread and associated queue T/Qa in block 72, thread and queue T/Qb in block 76 and thread and queue T/Qc in block 78. Similarly, process 3 in block 34 has message thread and queue T/Qa in block 80 and T/Qb in block 82. Process 2B in block 36 has a message thread and queue T/Qa in block 84 and T/Qb in block 86.

In the example distributed system of the preferred embodiment, as illustrated in FIG. 2, the connections between the processes are shown as connection 90 between Process 1 and process 2A, connection 92 between the process 2A and process 3, connection 94 between process 3 and 2B, and connection 96 between process 2A and 2B.

Within process 2A is illustrated a dispatcher thread and associated queue, shown in block 100. Process 3 is shown as having a dispatcher thread and queue in block 102.

As will be appreciated by those skilled in the art, the numbers of threads found in each process will vary depending on the application. The thread and queue pairs, in blocks 40, 42, 44 as shown in Process 1 are referred to as worker threads in the example of the preferred embodiment. Such threads are involved in the parallel processing of RPC request and response messages. Similarly the thread and queue pairs shown in blocks 46, 48, 50, 52, 54, 56, 58, 60 and 62 are worker threads and queues in the illustrated example of FIG. 2. A thread will be blocked, or suspend its operation, in waiting for the associated queue to receive a message.

Each thread and queue has an associated identifier (queue id) which is unique within the process in which the thread is found. In the example of the preferred embodiment the, queue id is referred to by the variable hQueue. As indicated above, each process may have one or more message receiver threads each which is responsible for receiving messages from connections made between the process and other processes in the distributed system. The dispatcher thread, as shown in blocks 100 and 102, in each process is responsible for passing an RPC request message to the appropriate available thread from the pool of worker threads within the process to permit the RPC message to be processed. Alternatively, the worker thread receiving the RPC message may indicate that message is not in the appropriate process within the distributed system to handle the RPC request and that the RPC message is to be forwarded to another process.

As shown in FIG. 2, each process may be connected to one or more processes, but each process is connected to any one process via a single connection, only. Associated with each of the connections in each of the processes is a connection identifier (a connection id), referred to in the preferred embodiment by the variable hConn).

In the preferred embodiment of the invention, each process contains a data table or similar data structure to permit the process to determine which of the other processes in the distributed system will be appropriate to receive a given RPC request. In the preferred embodiment, it is not essential that the process identified as being able to respond to a given RPC in the data structure of the process originating the RPC request in, in fact, able to directly respond to the RPC. For example in FIG. 2, Process 1 may contain data which indicates that process 2A of block 32 is able to functionally respond to a given RPC request. In fact, process 2A may respond to that RPC request by passing the RPC request on to process 3 shown in block 34. In such a case, process 2A of block 32, maintains within it a data structure which indicates that it is process 3 of block 34, and not process 2B of block 36, which has the functionality to respond to the given RPC request.

In the distributed system of the preferred embodiment of the invention, the RPC messages contain within them at anyone time, a value for hConn and hQueue which permits the RPC request and response to be efficiently passed through the distributed system to permit the RPC request to be responded to and the response to be communicated to the originating process.

In the example distributed system illustrated in FIG. 2, the Process 1 of block 30 which originates an RPC request creates the RPC request message and encodes as part of the message the hQueue value reflecting the thread in the originating process which is blocked as a result of initiating the RPC request. In the example of FIG. 2, a thread such as block 42 will create an RPC request message and the message thread of block 70 (or an associated component having a send function) will forward the RPC request message over connection 90 to process 2A of block 32. Message thread of block 72 receives the RPC request and dispatcher thread of block 100 determines whether any of worker threads of blocks 46, 48 or 50 are able to respond to the RPC request.

When the RPC request message is forwarded via connection 90, the hConn value of the RPC request is set to null. As indicated above, the hQueue value in the RPC message is set to the queue id value of the thread which originated the RPC request (in the example the queue id of the queue of block 42).

The message receiver thread of block 72, upon receiving the message, updates the hConn value to the connect id of connection 90. The dispatcher thread shown in block 100 determines which of the worker threads found in process 2A of block 32, is appropriate to handle the RPC request message. The message is placed in the appropriate queue relating to the thread which can handle the request. If the RPC request is processed directly by that thread, the RPC response is returned to Process 1 of block 30 via connection 90. The correct connection is determined by reference to the hConn value found in the RPC message. The message receiving thread of block 70 receives the RPC response message. The hQueue value determines on what queue the message thread will place the RPC response message. In this manner, the RPC message is sent to process 2A from Process 1 and returned to Process 1 from process 2A.

In a case where an RPC request message is determined by the worker thread of Process 2A to be one which is not processable by that worker thread, the worker thread will determine from data stored in process 2A which other process in the distributed system will be able to deal with the RPC request. The RPC request message is then placed on the appropriate queue for transfer to a further process. For example, the RPC message in process 2A of block 32 can be placed in queue Qc shown in block 78 for transfer to process 3 of block 34 via connection 92. The message thread, or associated send function block, sends the RPC request message over connection 92 to process 3 where message thread in block 80 receives the message.

Before the RPC message is forwarded by process 2A of block 32, the hConn value and the hQueue values of the message as it was received by the message thread of block 72, are stored in local memory in process 2A. The hConn value in the RPC request message is updated to reflect the connection identifier of connection 92, by Process 3 of block 34. The hQueue value of the RPC request message is also updated to reflect the worker queue id in the process 2A of block 32 which has processed the RPC request message to determine that it is not one which can be dealt with functionally in process 2A of block 32.

The RPC message which is communicated from process 2A to process 3, therefore has an updated hConn value and an updated hQueue value. Process 3 can deal with the message in the same manner as process 2A dealt with the message. If process 3 is able to process the RPC request and create an RPC response message, that message is sent back to process 2A over the connection identified in the RPC message, in this case connection 92. The RPC response message, when received by process 2A will be directed to the queue identified by the hQueue variable in the RPC response message. The associated thread then resets the value of hConn and hQueue as stored in its local memory, to permit the message to be passed back to Process 1 over connection 90 to be received by the message thread of block 70 for transfer to the appropriate queue in Process 1 as indicated in the restored hQueue value of the RPC response message.

As shown in FIG. 2, there are also connections established between process 2A and process 2B (via connection 96) and process 2B and process 3 (via connection 94).

The RPC message may be originated from any of the processes shown in FIG. 2, for example. The RPC request message will be routed to the appropriate process, by way of the mechanism shown above, by which the hQueue value and hConn values are updated and previous hQueue and hConn values stored locally by the appropriate thread, to permit the RPC to move through the distributed system.

As will be appreciated by those skilled in the art, this system may be used where the multi-threaded, multi process distributed system is implemented using different operating systems and communication protocols. For example, the distributed system of the invention may be included in a multi-threaded, multi-process distributed system in which the threads in the processes are not implemented with associated queues. In such a case, the remote procedure call messages will include identifiers which correspond directly to the appropriate threads, and not to queues related to the threads. Although the preferred embodiment of the invention describes the invention as implemented in a system which incorporates a queue for each thread this characteristic is not essential for the working of the invention.

The distributed system of the invention permits only one connection being established between pairs of processes in the multi-process distributed system. Different RPC messages can be transmitted over the same connection between processes. The connections (in the TCP/IP protocol, the sockets) are established on a process to process basis rather than on a thread to thread basis.

As has been described above, each process must maintain a data structure which reflects which process is able to respond to a given RPC request. The data is stored locally in each process and because RPC messages are forwarded through the distributed system, it is possible for processes to notionally perform a function where, in fact, the function is performed by another process. In other words, it is not necessary to update the information as to which process handles a particular function, even when the structure of the system is changed, as long as the correct pointers are in place in the various processes to permit the RPC messages to be routed through the distributed system to ultimately reach the appropriate process and thread.

Although a preferred embodiment of the present invention has been described here in detail, it will be appreciated by those skilled in the art, that variations may be made thereto, without departing from the spirit of the invention or the scope of the appended claims.

We claim:

1. A distributed processing system comprising:
    a plurality of processes, each of the processes comprising a plurality of threads and means for receiving, composing, and forwarding remote procedure call messages through a series of processes in the distributed processing system;
    a queue associated with each of the threads, each queue in each of the processes being associated with a predetermined queue identifier selected to uniquely identify each queue within each of the processes; and
    a set of connections selectively established between the processes, each one of the set of connections being associated with a predetermined connection identifier selected to uniquely identify the connection with the distributed processing system,
    wherein a remote procedure call message, when composed by an originating one of the processes, comprises:
        a first data element corresponding to the queue identifier of an originating queue in the originating one of the processes, and
        a second data element being set to predefined null value, and
    wherein the remote procedure call message having been forwarded over a connection by a first one of the processes, to a second one of the processes, for forwarding to a third one of the processes, comprises:
        its first data element corresponding to the queue identifier of a queue in the second one of the processes, and
        its second data element corresponding to the connection identifier of the connection from the first one of the process to the second one of the processes.

2. The distributed processing system of claim 1 wherein the set of connections consists of connections characterized by each pair of processes selected from the processes in the distributed processing system having no more than one connection between the pair of processes at any one time.

3. The distributed processing system of claim 1 or 2, wherein in each process, the means for receiving, composing, and forwarding remote procedure call messages comprises:
    a) update means for modifying the second data element in a received one of the remote procedure call messages by storing, in the second data element, the connection identifier of the connection by which the received one of the remote procedure call messages was forwarded to the process, b) means for determining whether the received one of the remote procedure call messages is processable within the process, c) means for processing the received one of the remote procedure call messages when the selected one of the remote procedure call messages is determined to be processable within the process, d) means for composing a remote procedure call message response when the selected one of the remote procedure call messages has been processed within the process, e) means for forwarding the remote procedure call message response by the connection indicated by the second data element of the received one of the remote procedure call messages, f) means for selecting, from the set of the processes of the distributed processing system when it is determined that the received one of the remote procedure call messages is not processable within the process, a further different process for processing the received one of the remote procedure call messages, and i) means for forwarding the received one of the remote procedure call messages to the further different process, ii) means for storing in a data location local to the process, the first and second data elements of the received one of the remote procedure call messages, and iii) means for updating the first data element of the received one of the remote procedure call messages to identify a one of the queues in the process.

4. The distributed processing system of claim 1 or 2, wherein the means for receiving remote procedure call messages comprises a message thread and associated queue.

5. The distributed processing system of claim 1 or 2, wherein the means for determining whether the received one of the remote procedure call messages is processable within the process comprises a receiver thread and associated queue.

6. The distributed processing system of claim 1 or 2, wherein the means for determining whether the received one of the remote procedure call messages is processable within the process comprises a receiver thread, an associated receiver thread queue, and a selected worker thread and an associated worker thread queue.

7. The distributed processing system of claim 1 or 2, wherein the means for processing the received one of the remote procedure call messages when the selected one of the remote procedure call messages is determined to be processable within the process comprises one or more worker threads, each worker thread having an associated queue.

8. A method for creating and forwarding remote procedure call messages in a distributed processing system having a plurality of processes, each of the processes comprising a plurality of threads and means for receiving, composing, and forwarding remote procedure call messages, a queue associated with each of the threads, each of the queues in each of the processes being associated with a predetermined queue identifier selected to uniquely identify each queue within each process, a set of connections selectively established between the processes, each one of the set of connections being associated with a predetermined connection identifier selected to uniquely identify the connection with the distributed processing system, the method comprising the steps of a) selectively establishing a set of connections between the processes in the distributed processing system, whereby any pair of selected processes is connected between the processes in the pair by no more than one connection, b) responding to an originating remote procedure call in a first thread in a first process by creating a remote procedure call message in the first process comprising i) a first data element corresponding to the queue identifier of the first thread, and ii) a second data element being set to a predefined null value c) selecting a second process for receipt of the remote procedure call message, d) forwarding the remote procedure call message to the second process, e) in the second process, modifying the second data element to correspond to the connection identifier of the connection between the first process and the second process, f) in the second process, determining whether the remote procedure call message is processable within the second process, g) when the remote procedure call message is determined to be processable within the process:

i) processing the remote procedure call message within the process, ii) creating a response in the remote procedure call message, and iii) returning the remote procedure call message by the connection indicated by the second data element, and h) when it is determined that the received one of the remote procedure call messages is not processable within the process:

i) selecting, from the set of the processes of the distributed processing system, a third process for processing the remote procedure call message, ii) storing in a data location local to the second process, the first and second data elements of the remote procedure call message, iii) updating the first data element to identify a one of the queues in the second process, and iv) forwarding the remote procedure call messages to the third process.

9. A method for creating and forwarding remote procedure call messages in a distributed processing system having a plurality of processes, each of the said processes comprising a plurality of threads and a means for receiving, composing, and forwarding remote procedure call messages, each of the threads in each of the processes being associated with a predetermined thread identifier selected to uniquely identify each thread within each process, a set of connections selectively established between the processes, each one of the set of connections being associated with a predetermined connection identifier selected to uniquely identify the connection with the distributed processing system, the method comprising the steps of:

a) selectively establishing a set of connections between the processes in the distributed processing system, whereby any pair of selected process is connected between the processes in the pair by no more than one connection, b) responding to an originating remote procedure call in a first thread in a first process by creating a remote procedure call message in the first process comprising i) a first data element corresponding to the thread identifier of the first thread, and ii) a second data element being set to a predefined null value,
c) selecting a second process for receipt of the remote procedure call message,
d) forwarding the remote procedure call message to the second process,
e) in the second process, modifying the second data element to correspond to the connection identifier of the connection between the first process and the second process,
f) in the second process, determining whether the remote procedure call message is processable within the second process,
g) when the remote procedure call message is determined to be processable within the process:
  i) processing the remote procedure call message within the process,
  ii) creating a response in the remote procedure call message, and
  iii) returning the remote procedure call message by the connection indicated by the second data element, and
h) when it is determined that the received one of the remote procedure call messages is not processable within the process:
  i) selecting, from the set of the processes of the distributed processing system, a third process for processing the remote procedure call message,
  ii) storing in a data location local to the second process, the first and second data elements of the remote procedure call message,
  iii) updating the first data element to identify a one of the threads in the second process, and
  iv) forwarding the remote procedure call messages to the third process.

10. A distributed processing system comprising:
a plurality of processes, each of the said processes comprising a plurality of threads and a means for receiving, composing, and forwarding remote procedure call messages, each of the threads in each of the processes being associated with a predetermined thread identifier selected to uniquely identify each thread within each process, and
a set of connections selectively established between the processes, each one of the set of connections being associated with a predetermined connection identifier selected to uniquely identify the connection with the distributed processing system,
wherein a remote procedure call message, when composed by an originating one of the processes, comprises,
  a first data element corresponding to the thread identifier of an originating one of the threads in the originating one of the processes, and
  a second data element being set to a predefined null value, and
wherein the a remote procedure call message, having been forwarded over a connection by a first one of the processes, to a second one of the processes, for forwarding to a third one of the processes, comprises,
  its first data element corresponding to the thread identifier of a one of the threads in the second one of the processes, and
  its second data element corresponding to the connection identifier of the connection from the first one of the process to the second one of the processes.

11. The distributed processing system of claim 10 wherein the set of connections consists of connections characterized by each pair of processes selected from the processes in the distributed processing system having no more than one connection between the pair of processes at any one time.

12. The distributed processing system of claim 10 or 11, wherein, in each process,
the means for receiving, composing, and forwarding remote procedure call messages comprises
a) update means for modifying the second data element in a received one of the remote procedure call messages by storing, in the second data element, the connection identifier of the connection by which the received one of the remote procedure call messages was forwarded to the process,
b) means for determining whether the received one of the remote procedure call messages is processable within the process,
c) means for processing the received one of the remote procedure call messages when the selected one of the remote procedure call messages is determined to be processable within the process,
d) means for composing a remote procedure call message response when the selected one of the remote procedure call messages has been processed within the process,
e) means for forwarding the remote procedure call message response by the connection indicated by the second data element of the received one of the remote procedure call messages,
f) means for selecting, from the set of the processes of the distributed processing system, when it is determined that the received one of the remote procedure call messages is not processable within the process, a further different process for processing the received one of the remote procedure call messages, and
  i) means for forwarding the received one of the remote procedure call messages to the further different process,
  ii) means for storing in a data location local to the process, the first and second data elements of the received one of the remote procedure call messages, and
  iii) means for updating the first data element of the received one of the remote procedure call messages to identify a one of the threads in the process.

13. The distributed processing system of claim 10 or 11, wherein the means for receiving remote procedure call messages comprises a message thread.

14. The distributed processing system of claim 10 or 11, wherein the means for determining whether the received one of the remote procedure call messages is processable within the process comprises a receiver thread.

15. The distributed processing system of claim 10 or 11, wherein the means for determining whether the received one of the remote procedure call messages is processable within the process comprises a receiver thread and a selected worker thread.

16. The distributed processing system of claim 10 or 11, wherein the means for processing the: received one of the remote procedure call messages when the selected one of the remote procedure call messages is determined to be processable within the process comprises one or more worker threads.

17. A computer readable memory for storing the instructions for use in the execution in a computer of either one of the methods of claim 11 or 12.

18. A program storage device, readable by a machine, tangibly embodying a program of instructions executable by the machine to perform method steps for creating and forwarding remote procedure call messages in a distributed processing system according to the method steps of claim 11 or 12.

* * * * *